United States Patent [19]

Arfiche et al.

[11] Patent Number: 5,236,981

[45] Date of Patent: Aug. 17, 1993

[54] STABILIZED HALOGENATED POLYMER COMPOSITIONS CONTAINING A LEAD OR ORGANOTIN COMPOUND

[75] Inventors: Mireille Arfiche, Lagny; Louis Carette, Issy Les Moulineaux; Pierre Pena Porta, Bouc Bel Air; Francois Pouenat, Paris, all of France

[73] Assignee: Rhone-Poulenc Chimie, Cedex, France

[21] Appl. No.: 865,509

[22] Filed: Apr. 9, 1992

[30] Foreign Application Priority Data

Apr. 9, 1991 [FR] France .................... 9104547

[51] Int. Cl.$^5$ .................... C08K 5/57; C08K 3/26
[52] U.S. Cl. .................... 524/178; 524/180; 524/181; 524/182; 524/399; 524/414; 524/420; 524/423; 524/430; 524/434; 524/436; 524/265
[58] Field of Search .......... 524/180, 181, 182, 178, 524/436, 399, 423, 420, 414, 430, 434, 265

[56] References Cited

U.S. PATENT DOCUMENTS

| | | | |
|---|---|---|---|
| 4,751,261 | 6/1988 | Miyata et al. | 524/181 |
| 4,808,649 | 2/1989 | Gay et al. | 524/265 |
| 4,931,492 | 6/1990 | Foster et al. | 524/188 |

FOREIGN PATENT DOCUMENTS 0246867 11/1987 European Pat. Off. .
60-118709 6/1985 Japan .
2075989 11/1981 United Kingdom .

OTHER PUBLICATIONS

R. Gachter et al., Plastic Additives Handbook, pp. 204-210 (1985).
L. Nass, Encyclopedia of PVC, pp. 299-303, 313-325 (1976).
Patent Abstracts of Japan, vol. 13, No. 461 (C-645)[3809] (1989).
2244 Research Disclosure, No. 310, 310103, p. 155 (1990).

*Primary Examiner*—Veronica P. Hoke
*Attorney, Agent, or Firm*—Finnegan, Henderson, Farabow, Garrett, Dunner

[57] ABSTRACT

The present invention relates to new stabilized compositions based on halogenated polymer and more specifically on chlorinated polymer. It relates more particularly to stabilized compositions based on chlorinated polymer, which are characterized in that they contain:

a) an effective quantity of at least one lead compound or of at least one organostannic compound, and
b) an effective quantity of at least one essentially amorphous basic aluminum magnesium carbonate denoted by the formula (I):

$$(MgO)_y \cdot Al_2O_3 \cdot (CO_2)_x \cdot (H_2O)_z \qquad (I).$$

23 Claims, No Drawings

STABILIZED HALOGENATED POLYMER COMPOSITIONS CONTAINING A LEAD OR ORGANOTIN COMPOUND

BACKGROUND OF THE INVENTION

The present invention relates to new stabilized compositions based on halogenated polymers and more specifically on chlorinated polymers. Halogenated polymers tend to dehydrohalogenate to release hydrohalogenic acid when being processed with heat; this results in the formation of polyene double bonds which are responsible for coloring the polymers.

Chlorinated polymers, for example, especially polyvinyl chloride (PVC), dehydrochlorinate to release hydrochloric acid when processed with heat. Numerous additives have been recommended to deal with this problem, on the one hand to limit the formation of hydrochloric acid or to fix it and on the other hand to decelerate the propagation of polyene double bonds. Reference may be made, for example, to *The Stabilization of Polyvinyl Chlorides* by F. Chevassus (Amphora Publications, 1957).

Among the compounds useful as additives which have been known for a long time, and are still very widely employed, are lead compounds and organostannic compounds.

Because of their toxicity, the use of lead compounds is restricted to the nonalimentary applications of chlorinated polymers, such as formulations for various types of pipes, parts for the building industry or formulations for the protection of electrical cables. Organostannic compounds are employed in the majority of applications of chlorinated polymers, whether alimentary or nonalimentary.

An acceptable stabilization of chlorinated polymers, and more particularly of PVC, in most cases requires the joint use of a number of stabilizers which act in a complementary and sometimes synergistic manner.

SUMMARY OF THE INVENTION

The present invention relates to stabilized compositions based on chlorinated polymers, which are characterized in that they contain:

a) an effective amount of at least one lead compound or of at least one organostannic compound, and b) an effective amount of at least one essentially amorphous basic aluminum magnesium carbonate represented by formula (I):

$$(MgO)_y \cdot Al_2O_3 \cdot (CO_2)_x \cdot (H_2O)_z \qquad (I)$$

wherein:

y denotes, in noise, a whole or fractional number such that $y \leq 1.7$, x denotes, in moles, an integral or fractional number such that $x \leq 0.7$, and z denotes, in moles, a whole or fractional number greater than or equal to 3.

DESCRIPTION OF THE PREFERRED EMBODIMENTS

The essentially amorphous basic aluminum magnesium carbonates of the present invention are non-crystalline compounds in contrast to the hydrotalcites of the prior art. The analysis of the one-dimensional structure of these compounds is generally interpreted to be a structure of monoatomic MgO layers of the brucite type alternating with monoatomic layers of aluminum carbonates.

According to X-ray diffraction analyses, the basic aluminum magnesium carbonates of the present invention consist of magnesium oxide, magnesium hydroxide or magnesium carbonate surrounded by amorphous basic aluminum carbonate and/or hydroxide. It is in this sense that amorphous or essentially amorphous compounds are referred to in the present text: magnesium oxide or magnesium hydroxide has a crystalline structure but the whole of the compound of formula (I) does not have a crystalline structure.

Accordingly, in formula (I), by amorphous it is meant that at least 75%, advantageously 90%, preferably 95%, most preferably 99%, of the aluminum is in amorphous form, i.e., in non-crystalline form, while the magnesium species is crystalline. According to the invention, in order to prevent the aluminum species from becoming crystalline, it is advantageous to add polyols, preferably polyols having 6 carbon atoms, most preferably sugars. Among the sugars, the preferred are those of the sorbitol family. The concentration of the polyol(s) is in the range of 0.1 to 20%, generally at least 0.25%, and preferably 1 to 10%, relative to the basic aluminum magnesium carbonate.

The amorphous basic aluminum magnesium carbonates of formula (I) can be prepared by coprecipitation, in the appropriate proportions, of a basic aluminum carbonate (or aluminum hydroxycarbonate) with a magnesium derivative, such as magnesium hydroxide or magnesium carbonate.

The coprecipitates thus obtained may have added to them various compounds which form a kind of coating on the particles of the basic aluminum magnesium carbonate of formula (I), although this coating is not required for the compounds of formula (I) to act as stabilizers. It is thus possible, for example, to add stearic acid or one of its derivatives, especially metal stearates, or a polyol such as sorbitol. These compounds make it possible to improve the dispersion of the basic aluminum magnesium carbonate in the chlorinated polymer or, if necessary, to improve the stability of the carbonate.

The drying of the basic aluminum magnesium carbonate is conducted so as to achieve the desired moisture content.

The compositions according to the invention generally contain from 0.005% to 5% by weight of amorphous basic aluminum magnesium carbonate of formula (I) in relation to the weight of chlorinated polymer, preferably from 0.01% to 2% by weight.

The chlorinated polymers are preferably polyvinyl chloride (PVC), polyvinylidene chloride, copolymers containing predominantly vinyl chloride units obtained from vinyl chloride and other monomers, and mixtures of polymers or copolymers in which a predominant part is obtained from vinyl chloride.

As a general rule, any kind of PVC is suitable for use in the present invention, irrespective of its method of preparation: polymerization in bulk, in suspension, in emulsion or of any other type, and whatever its intrinsic viscosity.

The vinyl chloride homopolymers may also be modified chemically, for example by chlorination.

Many vinyl chloride copolymers can also be stabilized against the effects of heat, i.e., yellowing and degradation. These are, in particular, the copolymers obtained by copolymerization of vinyl chloride with other monomers containing a polymerizable ethylenic bond, e.g., vinyl acetate or vinylidene chloride, maleic or fumaric acid or their esters, olefins such as ethylene, propylene and hexane, acrylic or methacrylic esters, styrene and vinyl ethers such as vinyl dodecyl ether. These copolymers usually contain at least 50% by weight of vinyl chloride units and preferably at least 80% by weight of vinyl chloride units.

The compositions according to the invention may also contain mixtures based on chlorinated polymers containing minor quantities of other polymers, such as halogenated polyolefins or acrylonitrile/butadiene/styrene copolymers.

PVC, by itself or mixed with other polymers, is the chlorinated polymer most widely employed in the compositions of the invention.

The lead compounds for use in the present invention are often inorganic compounds, but may also be organic compounds. These compounds are described in the *Encyclopedia of PVC* by Leonard I. Mass (1976) at pages 299–303. These lead compounds represent a very diverse class, the most commonly employed of which are dibasic lead carbonate, tribasic lead sulphate, tetrabasic lead sulphate, dibasic lead phosphite, lead orthosilicate, basic lead silicate, coprecipitate of lead silicate and sulphate, basic lead chlorosilicate, coprecipitate of silica gel and lead orthosilicate, dibasic lead phthalate, lead stearate, dibasic lead stearate, tetrabasic lead fumarate, dibasic lead maleate, lead 2-ethylhexanoate and lead laurate. The quantity of the lead compound in the compositions of the invention is generally from 0.005% to 5% by weight relative to the weight of the chlorinated polymer, preferably from 0.05% to 2% by weight.

The compositions according to the instant invention which contain a lead compound may further contain organic cadmium or barium compounds or mixtures thereof. These organic cadmium and barium compounds include cadmium carboxylates and phenolates and barium carboxylates and phenolates. Those most commonly employed are, for example, the cadmium or barium salts of maleic, acetic, diacetic, propionic, hexanoic, 2-ethylhexanoic, decanoic, undecanoic, lauric, myristic, palmitic, stearic, oleic, ricinoleic, behenic (docosanoic), hydroxystearic, hydroxyundecanoic, benzoic, phenylacetic, para-tert-butylbenzoic, and salicylic acids, cadmium or barium phenolates from phenol, naphthol, and phenols substituted by one or more alkyl radicals, such as nonylphenols. The organic cadmium compounds comprise up to 1% by weight relative to the weight of the chlorinated polymer, preferably from 0.1% to 0.6%, while the barium compounds comprise up to 5% by weight, preferably from 0.02% to 2% by weight.

For practical or economic reasons, the preferred choices among the organic barium compounds referred to above are barium propionate, barium 2-ethylhexanoate, barium laurate, barium stearate, barium oleate, barium ricinoleate, barium docosanoate, barium benzoate, barium para-tert-butylbenzoate, barium salicylate, barium mono(2-ethylhexyl) maleate, barium nonylphenates, barium naphthenate. The preferred choices among the organic cadmium compounds referred to above are cadmium propionate, cadmium ethylhexanoate, cadmium laurate, cadmium stearate, cadmium oleate, cadmium ricinoleate, cadmium docosanoate, cadmium benzoate, cadmium para-tert-butylbenzoate, cadmium salicylate, cadmium mono(2-ethylhexyl) maleate, cadmium nonylphenates and cadmium naphthenates.

Organic calcium and magnesium compounds may also be employed with the barium compounds. These compounds are generally chosen from the salts and phenolates referred to above in the case of barium. The calcium or magnesium compounds comprise up to 5% by weight, preferably from 0.02% to 2% by weight, relative to the weight of chlorinated polymer.

The compositions of the present invention may contain organostannic compounds together with the basic aluminum magnesium carbonates of formula (I). These organostannic compounds are described in *Plastics Additives Handbook* by Gachter/Muller (1985) at pages 204–210 or in the *Encyclopedia of PVC* by Leonard I. Nass (1976) at pages 313–325.

The organostannic compounds for use in the present invention are preferably dialkyltin carboxylates and dialkyltin mercaptides. Among these compounds, the ones most commonly employed are di-n-butyltin or di-n-octyltin derivatives such as dibutyltin dilaurate, dibutyltin maleate, dibutyltin laurate maleate, dibutyltin bis(mono-C$_4$–C$_8$-alkyl maleate), dibutyltin bis(laurylmercaptide, dibutyltin bis-S,S'-(isooctyl mercaptoacetate), dibutyltin β-mercaptopropionate, polymeric di-n-octyltin maleate, di-n-octyltin bis-S,S'-(isooctyl mercaptoacetate) and di-n-octyltin β-mercaptopropionate.

The organostannic compounds comprise from 0.005% to 5% by weight relative to the weight of the chlorinated polymer preferably from 0.01% to 2% by weight.

The compositions of the present invention which contain an organostannic compound and a basic aluminum magnesium carbonate frequently also contain an epoxy compound. The epoxy compound is preferably an epoxidized polyglyceride such as epoxidized soya oil, epoxidized linseed oil, epoxidized fish oils and epoxidized tallol. The epoxy compounds generally comprise up to 5% by weight relative to the weight of the chlorinated polymer, preferably from 0.1% to 2% by weight.

The compositions of the invention may also include other secondary organic stabilizers such as γ-hydroxyalkylated polyorganosiloxane oils. The γ-hydroxyalkylated polyorganosiloxane oils are preferably those corresponding to the general formula (II)

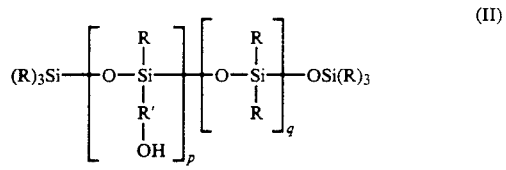

(II)

wherein:
the radicals R, which may be the same or different, denote a methyl or phenyl radical, at least 60 mol % of which are methyl radicals;
R' denotes a linear or branched alkylene radical containing from 2 to 6 carbon atoms;
p denotes an average number from 1 to 30; and
q denotes an average number from 1 to 100.

The oils preferably employed are those of formula (II) wherein:
R denotes a methyl radical;
R' denotes a trimethylene or 2-methyltrimethylene radical;
p denotes an average number from 2 to 20; and
q denotes an average number from 2 to 30.

The γ-hydroxyalkylated polyorganosiloxane oils generally comprise up to 5% by weight relative to the weight of the chlorinated polymer, preferably from 0.01% to 2% by weight. The presence of γ-hydroxyalkylated polyorganosiloxane oils makes it possible to lower appreciably the quantity of internal lubricants the compositions, e.g., hydrogenated castor oil, mixed lubricants, e.g., ester waxes, and external lubricants, while improving the impact strength of the polymer.

The compositions according to the invention may also contain the usual adjuvants such as other heat stabilizers, phenolic antioxidants, anti-UV agents such as benzophenones, benzotriazoles or sterically hindered amines (usually known under the designation of HALS).

The compositions according to the instant invention may be rigid formulations, i.e., without plasticizer, or semirigid ones, i.e., with reduced plasticizer contents, such as for applications in the building industry, the manufacture of various parts or electrical wiring, or, in the case of compositions containing only alimentary additives, for the manufacture of bottles. These formulations in most cases contain an impact improver such as a methacrylate/butadiene/styrene copolymer.

The present compositions may also be plasticized formulations such as those for the manufacture of films for agricultural use. The plasticizers employed are known compounds such as alkyl phthalates. Di(2-ethylhexyl) phthalate (usually called dioctyl phthalate) is most often employed. When the compositions of the present invention contain a plasticizer, the content thereof is generally from 5% to 120% by weight relative to the weight of chlorinated polymer.

The presence of basic aluminum magnesium carbonate in the compositions of the invention contributes a certain number of advantages. For example, in compositions containing lead compounds, the basic aluminum magnesium carbonate of formula (I) makes it possible to reduce the quantity of the lead compound and, when present, the cadmium compound without lowering the heat stability of the polymer. This represents a distinct advantage in that compounds which exhibit a certain toxicity are replaced in part by a potentially alimentary compound.

In compositions containing organostannic compounds, the presence of basic aluminum magnesium carbonate of formula (I) makes it possible to reduce, where appropriate, the quantity of epoxy compound, which is generally a liquid compound. The partial replacement of a liquid compound makes it possible to improve the rigidity and the VICAT degree (an index of impact strength) of shaped articles made from rigid compositions.

The incorporation of the various stabilizers or adjuvants is usually carried out on the chlorinated polymer in powder form. It is possible, of course, to prepare a mixture of 2 or more of the constituents of the compositions according to the invention before incorporating them into the chlorinated polymer. Any of the usual methods for incorporating the various stabilizers or adjuvants into the polymer can be employed. For example, the homogenization of the polymeric composition may be carried out on a kneader or roll mill, at a temperature such that the composition becomes fluid, normally between 150° C. and 200° C. in the case of PVC, and for a sufficient time, on the order of a few minutes to a few tens of minutes. The chlorinated polymer, and more particularly PVC, compositions may be processed by any of the techniques usually employed, e.g. extrusion, injection molding, blow-extrusion, calendering or rotational molding.

The examples which follow serve to illustrate the invention and should not be construed as limiting.

EXAMPLE 1

Preparation of a basic aluminum magnesium carbonate

An aqueous gel containing 608 g of magnesium hydroxide was introduced into a 5000 ml beaker with stirring at 200 revolutions/minute.

An aqueous gel containing 2915 g of aluminum hydroxycarbonate was then added over 5 minutes. The mixture was stirred for approximately 30 minutes at room temperature.

The mixture was subsequently dried in an oven for 2 hours at 70° C. A white powder of general formula (I) was obtained with:

$x = 0.37$,
$y = 0.84$, and
$z = 6.54$.

The mean particle size of the particles of this compound was 3 micrometers.

A sample was examined by X-ray diffraction. The diffraction spectrum showed a crystallized and relatively intense phase corresponding to magnesium hydroxide. No diffraction peak corresponding to aluminum hydroxide and/or carbonate was seen; therefore, the compounds are of an amorphous nature.

EXAMPLE 2

Preparation of a basic aluminum magnesium carbonate 1080 g of an aqueous magnesium carbonate gel (which had a concentration of 6% by weight per weight, expressed as magnesium hydroxide) was charged into a 5 liter reactor fitted with a stirrer.

This was stirred slowly and 2520 g of an aqueous aluminum hydroxide gel (which had a concentration of 9% by weight per weight, expressed as $Al_2O_3$) was added.

High speed stirring was then carried out for 10 minutes.

The resulting mixture was spray dried (outlet temperature: 100° C.).

The basic aluminum magnesium carbonate of formula (I) exhibited the following characteristics:

$x = 0.65$ ($CO_2/Al_2O_3$ molar ratio),
$y = 0.47$ ($MgO/Al_2O_3$ molar ratio), and
$z = 5.18$ ($H_2$)/$Al_2O_3$ molar ratio).

A sample was examined by X-ray diffraction. The diffraction spectrum showed a relatively low intensity phase corresponding to $MgCO_3.3H_2O$. No diffraction peak corresponding to aluminum hydroxide and/or carbonate was seen; therefore, the compounds were of an amorphous nature.

EXAMPLES 3 and 4

Three formulations were prepared by homogenization at room temperature, in a fast mixer, of the following different constituents:

| | |
|---|---|
| PVC prepared by suspension polymerization, exhibiting a K value of 60: | 100 g |
| impact improver (methacrylate/butadiene/styrene copolymer): | 7 g |
| $TiO_2$: | 4 g |
| $CaCO_3$: | 4 g |

| | | | |
|---|---|---|---|
| lubricants Wax E and Wax OP (alkyl ester waxes containing a long fatty acid chain): | | | 1 g |
| Pb stearate: | | | see Table 1 |
| Pb phosphite: | | | see Table 1 |
| basic Al Mg carbonate of formula (I) as prepared in Example 1 and having a mean particle size of 3 μm: | | | see Table 1 |

The time needed for good homogenization was approximately 10 minutes.

The homogeneous mixtures thus obtained were introduced into a Plastograph TM (Brabender) consisting of a heated vessel in which counterrotating blades rotate in order to knead the polymer and the additives. The vessel contained 32 g of composition; the temperature was maintained at 180° C. and the rate of rotation of the blades was 60 revolutions/minute.

Samples were taken after 5 min., 10 min. and 15 min. of kneading under these conditions and the color of the samples taken was measured with a Minolta colorimeter and expressed as a yellowing index according to ASTM standard D 1925-70 (the higher the value of this index, the more colored is the sample).

The yellowing indices thus measured for each of the formulations and the lengths of time in minutes after which these formulations became black during the treatment at 180° C. (long-time stability) are collated in Table 1 below.

TABLE 1

| Tests | Pb stearate | Pb phosphite | Basic Al Mg Carbonate | Yellowing Index For 5 min | For 10 min | For 15 min | Black at |
|---|---|---|---|---|---|---|---|
| Control 1 | 2 g | 2 g | 0 g | 6.12 | 9.44 | 11.56 | 70 min |
| Example 3 | 2 g | 1.5 g | 0.5 g | 6.12 | 8.73 | 10.6 | 70 min |
| Example 4 | 1.5 g | 2 g | 0.5 g | 8.32 | 10.7 | 10.7 | 75 min |

The presence of basic aluminum magnesium carbonate of formula (I) enabled the quantity of lead compound to be reduced, while slowing down the development of the color and maintaining or increasing the long-term stability of the composition.

EXAMPLE 5

Two formulations containing the following constituents were prepared by following the operating procedure described in Examples 3 and 4:

| | |
|---|---|
| PVC prepared in suspension, of K value = 60: | 100 g |
| impact improver: | 7 g |
| TiO$_2$: | 4 g |
| CaCO$_3$: | 4 g |
| lubricants Wax E and Wax OP: | 1 g |
| calcium stearate: | 0.4 g |
| cadmium laurate/barium laurate (weight ratio 2/1): | see Table 2 |
| Pb phosphite: | see Table 2 |
| basic Al Mg carbonate of formula (I) as prepared in Example 1: | see Table 2 |

The yellowing indices measured on each of the formulations are presented in Table 2 below.

TABLE 2

| Tests | Cd/Ba Sta- blizer | Pb Phos- phite | Basic Al Mg Carbonate | Yellowing Index For 5 Min | For 10 Min | For 15 Min |
|---|---|---|---|---|---|---|
| Control 1 | 2.5 g | 1.5 g | 0 g | 6.2 | 8.6 | 12.23 |
| Example 5 | 2 g | 1.5 g | 0.5 g | 4.87 | 7.94 | 11.25 |

What is claimed is:

1. Stabilized compositions based on chlorinated polymer comprising:
   a) an effective amount of at least one lead compound or of at least one organostannic compound, and
   b) an effective amount of at least one essentially amorphous basic aluminum magnesium carbonate represented by formula (I):

$$(MgO)_y.Al_2O_3.(CO_2)_x.(H_2O)_z \qquad (I)$$

wherein:
   y denotes, in moles, a whole or fractional number such that $y \leq 1.7$,
   x denotes, in moles, a whole or fractional number such that $x \leq 0.7$, and
   z denotes, in moles, a whole or fractional number greater than or equal to 3.

2. Compositions according to claim 1, wherein the chlorinated polymer is selected from the group consisting of polyvinyl chloride, polyvinylidene chloride, copolymers containing predominantly vinyl chloride units obtained from vinyl chloride and other monomers, and mixtures of polymers or copolymers in which a predominant part is obtained from vinyl chloride.

3. Compositions according to claim 1, comprising from 0.005% to 5% by weight of the amorphous basic aluminum magnesium carbonate of formula (I) relative to the weight of chlorinated polymer.

4. Compositions according to claim 3, comprising from 0.01% to 2% by weight of the amorphous basic aluminum magnesium carbonate of formula (I) relative to the weight of chlorinated polymer.

5. Compositions according to claim 1 wherein the lead compound is selected from the group consisting of dibasic lead carbonate, tribasic lead sulphate, tetrabasic lead sulphate, dibasic lead phosphite, lead orthosilicate, basic lead silicate, a coprecipitate of lead silicate and sulphate, basic lead chlorosilicate, a coprecipitate of silica gel and lead orthosilicate, dibasic lead phthalate, lead stearate, dibasic lead stearate, tetrabasic lead fumarate, dibasic lead maleate, lead 2-ethylhexanoate and lead laurate.

6. Compositions according to claim 1, wherein the quantity of lead compound is from 0.005% to 5% by weight relative to the weight of the chlorinated polymer.

7. Compositions according to claim 6, wherein the quantity of lead compound is from 0.05% to 2% by weight relative to the weight of the chlorinated polymer.

8. Compositions according to claim 1, further comprising organic cadmium or barium compounds or mixtures thereof.

9. Compositions according to claim 8, wherein the organic cadmium or barium compounds are cadmium carboxylates or phenolates or barium carboxylates or phenolates or mixtures thereof.

10. Compositions according to claim 8, wherein the quantity of organic cadmium compounds is up to 1% by weight relative to the weight of the chlorinated polymer and the quantity of barium compounds is up to 5% by weight relative to the weight of the chlorinated polymer.

11. Compositions according to claim 10, wherein the quantity of organic cadmium compounds is from 0.01% to 0.6% by weight relative to the weight of the chlorinated polymer.

12. Compositions according to claim 10, wherein the quantity of barium compounds is from 0.02% to 2% by weight relative to the weight of the chlorinated polymer.

13. Compositions according to claim 1, wherein the organostannic compound is a dialkyltin carboxylate or dialkyltin mercaptide.

14. Compositions according to claim 13, wherein the organostannic compound is a di-n-butyltin derivative or a di-n-octyltin derivative.

15. Compositions according to claim 1, wherein the quantity of the organostannic compound is from 0.005% to 5% by weight relative to the weight of the chlorinated polymer.

16. Compositions according to claim 15, wherein the quantity of the organostannic compound is from 0.01% to 2% by weight relative to the weight of the chlorinated polymer.

17. Compositions according to claim 1, further comprising an effective quantity of a γ-hydroxyalkylated polyorganosiloxane oil of general formula (II)

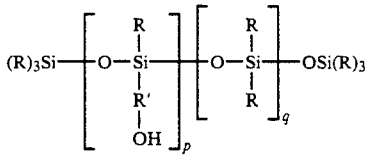

wherein:
- the radicals R, which are the same or different, denote a methyl or phenyl radical, at least 60 mol % of which are methyl radicals;
- R' denotes a linear or branched alkylene radical containing 2 to 6 carbon atoms;
- p denotes an average number from 1 to 30; and
- q denotes an average number from 1 to 100.

18. Compositions according to claim 17, containing an oil of formula (II) wherein:
- R denotes a methyl radical;
- R' denotes a trimethylene or 2-methyltrimethylene radical;
- p denotes an average number from 2 to 20; and
- q denotes an average number from 2 to 30.

19. Compositions according to claim 1, further comprising up to 5% weight of γ-hydroxyalkylated polyorganosiloxane oil relative to the weight of the chlorinated polymer.

20. Compositions according to claim 19, further comprising from 0.01% to 2% by weight of γ-hydroxyalkylated polyorganosiloxane oil relative to the weight of the chlorinated polymer.

21. Compositions according to claim 1, wherein the amorphous basic aluminum magnesium carbonate further comprises from 0.1% to 20% by weight of a polyol.

22. Compositions according to claim 21, wherein the amorphous basic aluminum magnesium carbonate further comprises from 1% to 10% by weight of a polyol.

23. Compositions according to claim 21, wherein the polyol is sorbitol.

* * * * *